(12) United States Patent
Huang et al.

(10) Patent No.: US 8,264,998 B2
(45) Date of Patent: Sep. 11, 2012

(54) METHOD, APPARATUS AND SYSTEM FOR CONTROLLING MULTICAST BEARER RESOURCES

(75) Inventors: Shibi Huang, Shenzhen (CN); Yu Zuo, Shenzhen (CN); Ning Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 12/428,771

(22) Filed: Apr. 23, 2009

(65) Prior Publication Data

US 2009/0207841 A1 Aug. 20, 2009

Related U.S. Application Data

(63) Continuation of application No. PCT/CN2008/070904, filed on May 7, 2008.

(30) Foreign Application Priority Data

Jun. 13, 2007 (CN) .......................... 2007 1 0111019

(51) Int. Cl.
*H04H 20/71* (2008.01)
*H04L 12/28* (2006.01)
*H04L 12/56* (2006.01)
*H04J 3/26* (2006.01)
*H04J 3/16* (2006.01)

(52) U.S. Cl. .................. 370/312; 370/390; 370/395.21; 370/395.41; 370/432; 370/468

(58) Field of Classification Search .................. None
See application file for complete search history.

(56) References Cited

U.S. PATENT DOCUMENTS

| 2007/0053361 | A1 | 3/2007 | Chen et al. |
| 2007/0105557 | A1* | 5/2007 | Israelsson et al. ............ 455/436 |
| 2007/0253409 | A1 | 11/2007 | Fu et al. |
| 2009/0116382 | A1 | 5/2009 | Liu |

FOREIGN PATENT DOCUMENTS

| CN | 1674550 A | 9/2005 |
| CN | 1863149 A | 11/2006 |

(Continued)

OTHER PUBLICATIONS

"Telecommunications and Internet Converged Services and Protocols for Advanced Networking (TISPAN); Resource and Admission Control Sub-system (RACS); Functional Architecture; Release 2," ETSI Standard, draft ETSI TS 182 019 V0.6.2:1-110 (May 2007).*

(Continued)

*Primary Examiner* — Ayaz Sheikh
*Assistant Examiner* — Sori Aga
(74) *Attorney, Agent, or Firm* — Leydig, Voit & Mayer, Ltd.

(57) ABSTRACT

A method, apparatus, and system for controlling multicast bearer resources are disclosed, which employ a resource and admission control subsystem (RACS) to control the multicast bearer resources. The method includes: a network entity in a RACS receives a request for controlling multicast bearer resources from a bearer-layer network entity and controls the multicast bearer resources. The network entity in the RACS includes: a receiving unit adapted to receive a request for controlling multicast bearer resources from a bearer-layer network entity and a control unit adapted to control the multicast bearer resources.

20 Claims, 9 Drawing Sheets

FOREIGN PATENT DOCUMENTS

| | | |
|---|---|---|
| CN | 1925419 A | 3/2007 |
| CN | 101030921 A | 9/2007 |
| EP | 1 718 006 A1 | 11/2006 |
| WO | WO 2006/087067 A1 | 8/2006 |

OTHER PUBLICATIONS

"Telecommunications and Internet Converged Services and Protocols for Advanced Networking (TISPAN); Resource and Admission Control Sub-System (RACS); Functional Architecture; Release 2 (draft)," *ETSI Standard*, V0.4.1: 1-80 (Feb. 2007).

Friedrich et al., "Next Generation IPTV Services for an Extended IMS Architecture," *Eighth International Symposium on Autonomous Decentralized Systems (IEEE)*, 429-436 (Mar. 2007).

Huawei Technologies Co., Ltd., "IMS Enabled IPTV Architecture," *International Telecommunications Union (Telecommunication Standardization Sector)*, Input Document, Focus Group on IPTV, FG IPTV-ID-0032: 1-5 (Jul. 2006).

"Telecommunications and Internet Converged Services and Protocols for Advanced Networking (TISPAN); Resource and Admission Control Sub-system (RACS); Functional Architecture; Release 2," *ETSI Standard*, draft ETSI TS 182 019 V0.6.2: 1-110 (May 2007).

$2^{nd}$ Office Action in corresponding Chinese Application No. 200710111019.3 (Nov. 2, 2010).

Written Opinion of the International Searching Authority in corresponding PCT Application No. PCT/CN2008/070904 (Aug. 21, 2008).

"ETSI ES 282 003—Telecommunications and Internet converged Services and Protocols for Advanced Networking (TISPAN); Resource and Admission Control Sub-system (RACS); Functional Architecture," Jun. 2006, Version 1.1.1, $3^{rd}$ Generation Partnership Project, France.

Notice of Reasons for Rejection in corresponding Japanese Application No. 2010-500058 (Mar. 22, 2011).

International Search Report in corresponding PCT Application No. PCT/CN2008/070904 (Aug. 21, 2008).

3rd Office Action in corresponding Chinese Application No. 200710111019.3 (Dec. 31, 2011).

"Draft ETSI TS 182.019—Telecommunications and Internet Converged Services and Protocols for Advanced Networking (TISPAN); Resource and Admission Control Sub-system (RACS); Functional Architecture; Release 2," May 2007, Version 0.6.2, ETSI, Sophia Antipolis, France.

\* cited by examiner

METHOD, APPARATUS AND SYSTEM FOR CONTROLLING MULTICAST BEARER RESOURCES

CROSS-REFERENCE TO RELATED APPLICATIONS

This application is a continuation of International Patent Application No. PCT/CN2008/070904, filed May 7, 2008, which claims priority to Chinese Patent Application No. 200710111019.3, filed Jun. 13, 2007, both of which are hereby incorporated by reference in their entirety.

FIELD OF THE TECHNOLOGY

The present invention relates to the fields of communication and network, and more particularly to a method, apparatus, and system for controlling multicast bearer resources.

BACKGROUND

Internet Protocol Television (IPTV) services are based on broadband IP networks and mainly focus on streaming media. Compared with conventional TV, IPTV can support more abundant and flexible services, provide a comprehensive IPTV value-added service platform, and realize services such as communication, data, video, and audio. Data generated by a source is needed to be sent to a plurality of destination nodes in live television/broadcast television (LTV/BTV) services among the IPTV, that is, a point-to-multipoint communication. Currently, the solution to point-to-multipoint communication is a multicast technology that can effectively utilize the network bandwidth and avoid waste of bandwidth resources.

In order to support the multicast technology, a Resource and Admission Control Subsystem (RACS) architecture is proposed, and it is described in detail in Telecommunication and Internet converged Services and Protocols for Advanced Networking (TISPAN).

Figure 1:
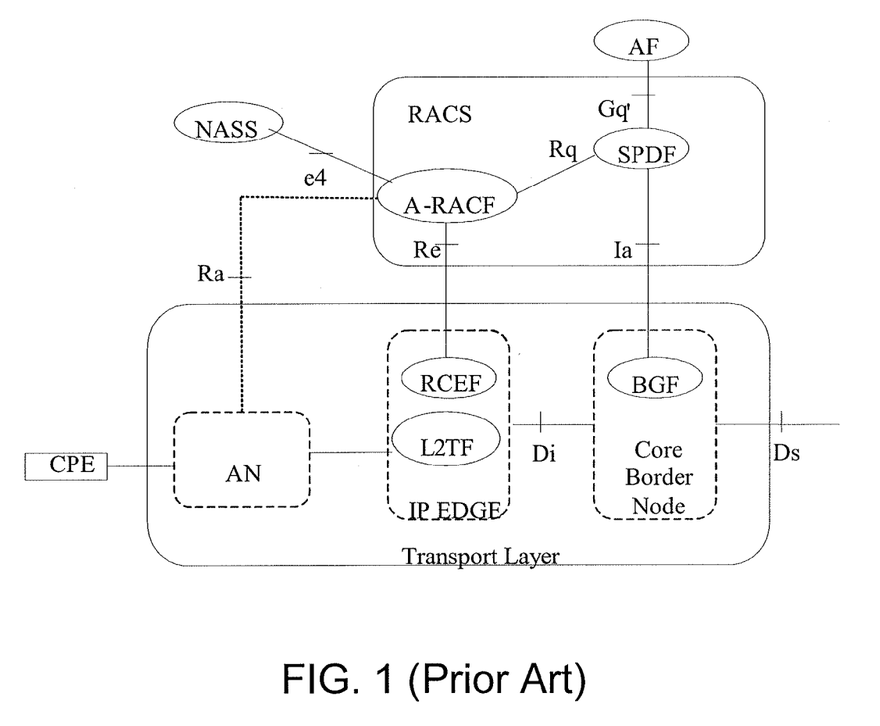
FIG. 1 shows functional architecture of a conventional RACS.

By implementing resource admission control, the RACS hides details of the transport network from the service layer, supports the separation of service control and transport functions, and gets to know the resource usage condition of the transport network, so as to ensure the correct and proper use of resources of the transport network, thus ensuring the Quality of Service (QoS) of the service and preventing the bandwidth and service from being embezzled. FIG. 1 shows functional architecture of an RACS. The main network elements in the figure are introduced as follows.

A service-based policy decision function (SPDF) provides a universal interface to the application layer, hides the underlying network topology and specific access type, and provides service-based policy control. The SPDF selects a local policy according to a request of an Application Function (AF), maps the request into Internet Protocol Quality of Service (IPQOS) parameters, and sends the parameters to an Access-Resource and Admission Control Function (A-RACF) and a Border Gateway Function (BGF), so as to request for corresponding resources.

The A-RACF is located in an access network and has admission control and network policy convergence functions. The A-RACF receives a request from the SPDF, and then realizes admission control according to a stored policy, thus accepting or refusing the request for transport resources. The A-RACF obtains network attachment information and user QoS list information from a Network Attachment Sub-System (NASS) via an e4 reference point. Accordingly, available network resources can be determined according to network location information (for example, a physical node address of an access user). Meanwhile, the user QoS list information is referred to when a resource allocation request is processed.

The transport layer contains three types of functional entities. Among them, BGF is a border gateway, which can be located between the access network and the core network (for realizing functions of a core border gateway) and can also be located between two core networks (for realizing functions of an Internet border gateway). Under the control of SPDF, BGF completes Network Address Translation (NAT), gating, QoS label, bandwidth restriction, measurement and resource synchronization functions. A Resource Control Enforcement Function (RCEF) implements the Layer 2/Layer 3 (L2/L3) media stream policy defined by an access operator that is sent via a Re reference point by A-RACF to accomplish gating, QoS label, bandwidth restriction and other functions. A Layer 2 Termination Function (L2TF) is a functional entity terminating the Layer 2 connection in the access network. The RCEF and L2TF are different functional entities, and are generally realized together on a physical equipment, IP Edge.

In addition, in the latest draft for RACS R2, a new function, i.e., Core-RACF (C-RACF) is defined, which is located in the core network for performing resource admission control.

Figure 2:
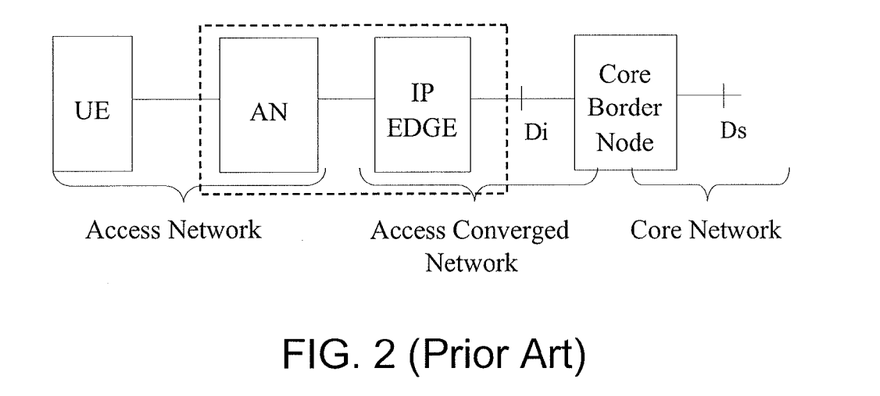
FIG. 2 is a schematic view of a conventional bearer layer network divided into three segments.

For ease of the subsequent description given to the control of multicast bearer resources, the bearer layer network is divided into three segments: access network, access converged network, and core network, as shown in FIG. 2. The segment between user equipment (UE) and an admission control policy enforcement node (may be an AN or IP Edge) is referred to as the access network. The segment between this node and a core border node is referred to as the access converged network. The segment beyond the core border node is referred to as the core network segment. The SPDF returns a final resource authorization result to the AF.

The inventor found during research and application that IPTV multicast services have currently been operated in traditional networks, but the effective control of multicast bearer resources has not been realized in the RACS architecture.

SUMMARY

Accordingly, the present invention is directed to a method, apparatus, and system for controlling multicast bearer resources, so as to control the multicast bearer resources based on a Resource and Admission Control Subsystem (RACS).

The method of the present invention includes the following steps.

A network entity in an RACS receives a request for controlling multicast bearer resources from a bearer-layer network entity and controls the multicast bearer resources.

The network entity of the present invention is located in an RACS, and includes a receiving unit adapted to receive a request for controlling multicast bearer resources from a bearer-layer network entity, and a control unit adapted to control the multicast bearer resources.

The system for controlling multicast bearer resources of the present invention includes a bearer-layer network entity adapted to initiate a request for controlling multicast bearer resources and a network entity in an RACS adapted to receive the request for controlling the multicast bearer resources from the bearer-layer network entity, and control the multicast bearer resources.

In the present invention, after receiving a request for controlling multicast bearer resources from a user, the bearer-layer network entity forwards the request for controlling multicast bearer resources to the RACS. After receiving the request for controlling the multicast bearer resources from the bearer-layer network entity, the network entity in the RACS controls the multicast bearer resources. As such, the RACS can support the resource control of multicast traffic flows. In this way, the management and admission control function for multicast resources does not need to be introduced into the bearer-layer entity. Meanwhile, centralized and unified management of unicast and multicast resources can be achieved, thus ensuring that unicast and multicast services can fully share the bearer resources.

DETAILED DESCRIPTION

In order to control multicast bearer resources by applying a Resource and Admission Control Subsystem (RACS), the present invention proposes a solution of employing an RACS to control multicast bearer resources, so as to enable the RACS to support the resource control of multicast traffic flows, thus ensuring smooth proceeding of Internet Protocol Television (IPTV) services.

Figure 3:
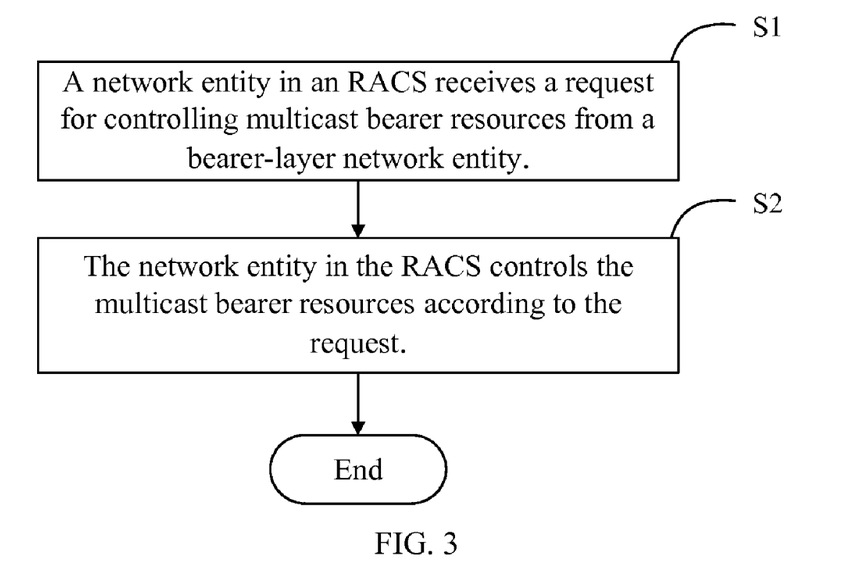
FIG. 3 is a flow chart of a method for controlling multicast bearer resources according to an embodiment of the present invention.

Based on the above objective, the present invention provides a method for controlling multicast bearer resources. Referring to FIG. 3, the method includes the following steps.

In Step S1, a network entity in an RACS receives a request for controlling the multicast bearer resources from a bearer-layer network entity.

In order to achieve the control of the multicast bearer resources by the RACS, after receiving a multicast group join request message, a resource modification request message or a resource release request message from a user, the bearer-layer entity, which may be an access node (AN) or IP Edge, needs to actively initiate a request for controlling the multicast bearer resources to the RACS, thus handing over the control of the multicast bearer resources to the RACS.

In Step S2, the network entity in the RACS controls the multicast bearer resources according to the request.

According to different control requests initiated by the user, the process in which the network entity in the RACS controls multicast bearer resources according to the request initiated by bearer-layer network entity and returns a control response includes the following cases.

Case 1: The network entity in the RACS receives a request for applying for the multicast bearer resources from the bearer-layer network entity; and the network entity in the RACS performs admission authorization and resource reservation for multicast bearer resources according to the request, and returns a resource application result response to the bearer-layer network entity.

Particularly, if the network entity in the RACS that interacts with the bearer-layer network entity is an Access-Resource and Admission Control Function (A-RACF), after receiving a request for applying for the multicast bearer resources from the bearer-layer network entity, the A-RACF performs admission authorization and resource reservation for multicast bearer resources of an access side according to the request, and returns a resource application result response to the bearer-layer network entity according to an application result of the access side. Alternatively, after receiving a request for applying for the multicast bearer resources from the bearer-layer network entity, the A-RACF performs admission authorization and resource reservation for multicast bearer resources of an access side according to the request, applies to a Service-based Policy Decision Function (SPDF) or a Core-RACF (C-RACF) for multicast bearer resources of a core network, and returns a resource application result response to the bearer-layer network entity according to application results of the access side and the core network.

Particularly, if the network entity in the RACS that interacts with the bearer-layer network entity is the SPDF, after receiving a request for applying for the multicast bearer resources from the bearer-layer network entity, the SPDF applies to the A-RACF for multicast bearer resources of an access side, and returns a resource application result response to the bearer-layer network entity according to an application result of the access side. Alternatively, after receiving a request for applying for the multicast bearer resources from the bearer-layer network entity, the SPDF respectively applies to the A-RACF and the C-RACF for multicast bearer resources of an access side and a core network, and returns a resource application result response to the bearer-layer network entity according to application results of the access side and the core network.

Case 2: The network entity in the RACS receives a request for modifying the multicast bearer resources from the bearer-layer network entity; and the network entity in the RACS performs admission authorization and resource modification for modifying the multicast bearer resources according to the request, and returns a resource modification result response to the bearer-layer network entity.

Particularly, if the network entity in the RACS that interacts with the bearer-layer network entity is the A-RACF, after receiving a request for modifying the multicast bearer resources from the bearer-layer network entity, the A-RACF performs admission authorization and resource modification for modifying multicast bearer resources of an access side according to the request, and returns a resource modification result response to the bearer-layer network entity according to a modification result of the access side. Alternatively, after receiving a request for modifying the multicast bearer resources from the bearer-layer network entity, the A-RACF performs admission authorization and resource modification for modifying multicast bearer resources of an access side according to the request for modifying the multicast bearer resources, requests the SPDF or the C-RACF for modifying multicast bearer resources of a core network, and returns a resource modification result response to the bearer-layer network entity according to modification results of the access side and the core network.

Particularly, if the network entity in the RACS that interacts with the bearer-layer network entity is the SPDF, after receiving a request for modifying the multicast bearer resources from the bearer-layer network entity, the SPDF requests the A-RACF for modifying multicast bearer resources of an access side, and returns a resource modification result response to the bearer-layer network entity according to a modification result of the access side. Alternatively, after receiving a request for modifying the multicast bearer resources from the bearer-layer network entity, the SPDF respectively requests the A-RACF and the C-RACF for modifying multicast bearer resources of an access side and a core network, and returns a resource modification result response to the bearer-layer network entity according to modification results of the access side and the core network.

Case 3: the network entity in the RACS receives a request for releasing the multicast bearer resources from the bearer-layer network entity; and the network entity in the RACS releases corresponding multicast bearer resources, and returns a release result response to the bearer-layer network entity.

Particularly, if the network entity in the RACS that interacts with the bearer-layer network entity is the A-RACF, after receiving a request for releasing the multicast bearer resources from the bearer-layer network entity, the A-RACF releases multicast bearer resources of an access side, and returns a release result response to the bearer-layer network entity according to a release result of the access side. Alternatively, after receiving a request for releasing the multicast bearer resources from the bearer-layer network entity, the A-RACF releases multicast bearer resources of an access side, requests the SPDF or the C-RACF for releasing multicast bearer resources of a core network, and returns a release result response to the bearer-layer network entity according to release results of the access side and the core network.

Particularly, if the network entity in the RACS that interacts with the bearer-layer network entity is the SPDF, after receiving a request for releasing the multicast bearer resources from the bearer-layer network entity, the SPDF requests the A-RACF for releasing multicast bearer resources of an access side, and returns a release result response to the bearer-layer network entity according to a release result of the access side. Alternatively, after receiving a request for releasing the multicast bearer resources from the bearer-layer network entity, the SPDF respectively requests the A-RACF and the C-RACF for releasing multicast bearer resources of an access side and a core network, and returns a release result response to the bearer-layer network entity according to release results of the access side and the core network.

Figure 4:
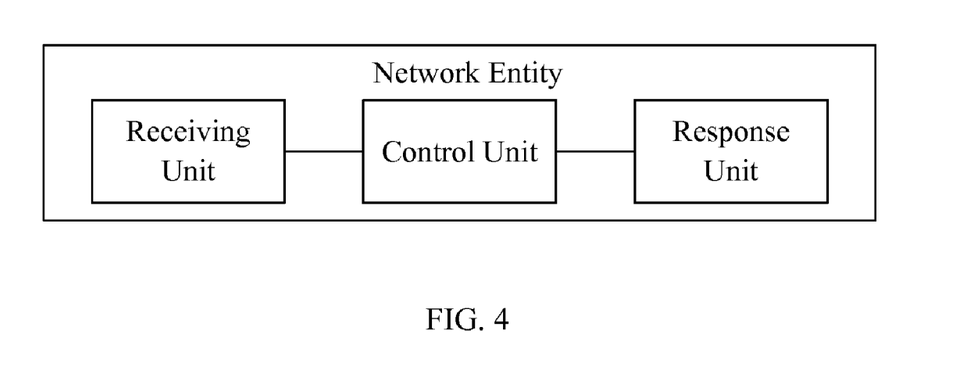
FIG. 4 is a schematic structural view of a network entity in an RACS of an apparatus for controlling multicast bearer resources according to an embodiment of the present invention.

The present invention further provides a network entity, which is located in an RACS and may be an A-RACF or SPDF. Referring to FIG. 4, the network entity includes a receiving unit and a control unit, and may further include a response unit.

The receiving unit is adapted to receive a request for controlling multicast bearer resources from a bearer-layer network entity.

The control unit is adapted to control the multicast bearer resources according to the request received by the receiving unit.

The response unit is adapted to return a control response to the bearer-layer network entity that initiates the request for controlling multicast bearer resources.

The present invention further provides a multicast bearer network. The multicast bearer network includes a bearer-layer network entity and a network entity in an RACS.

The bearer-layer network entity is adapted to initiate a request for controlling multicast bearer resources.

The network entity in the RACS is adapted to receive the request for controlling the multicast bearer resources from the bearer-layer network entity, control the multicast bearer resources according to the request for controlling the multicast bearer resources, and return a control response to the bearer-layer network entity. Particularly, the network entity in the RACS controls multicast bearer resources of an access side according to the request for controlling the multicast bearer resources, or controls multicast bearer resources of an access side and a core network according to the request for controlling the multicast bearer resources.

The present invention is further described in detail with reference to the following six embodiments.

Figure 5:
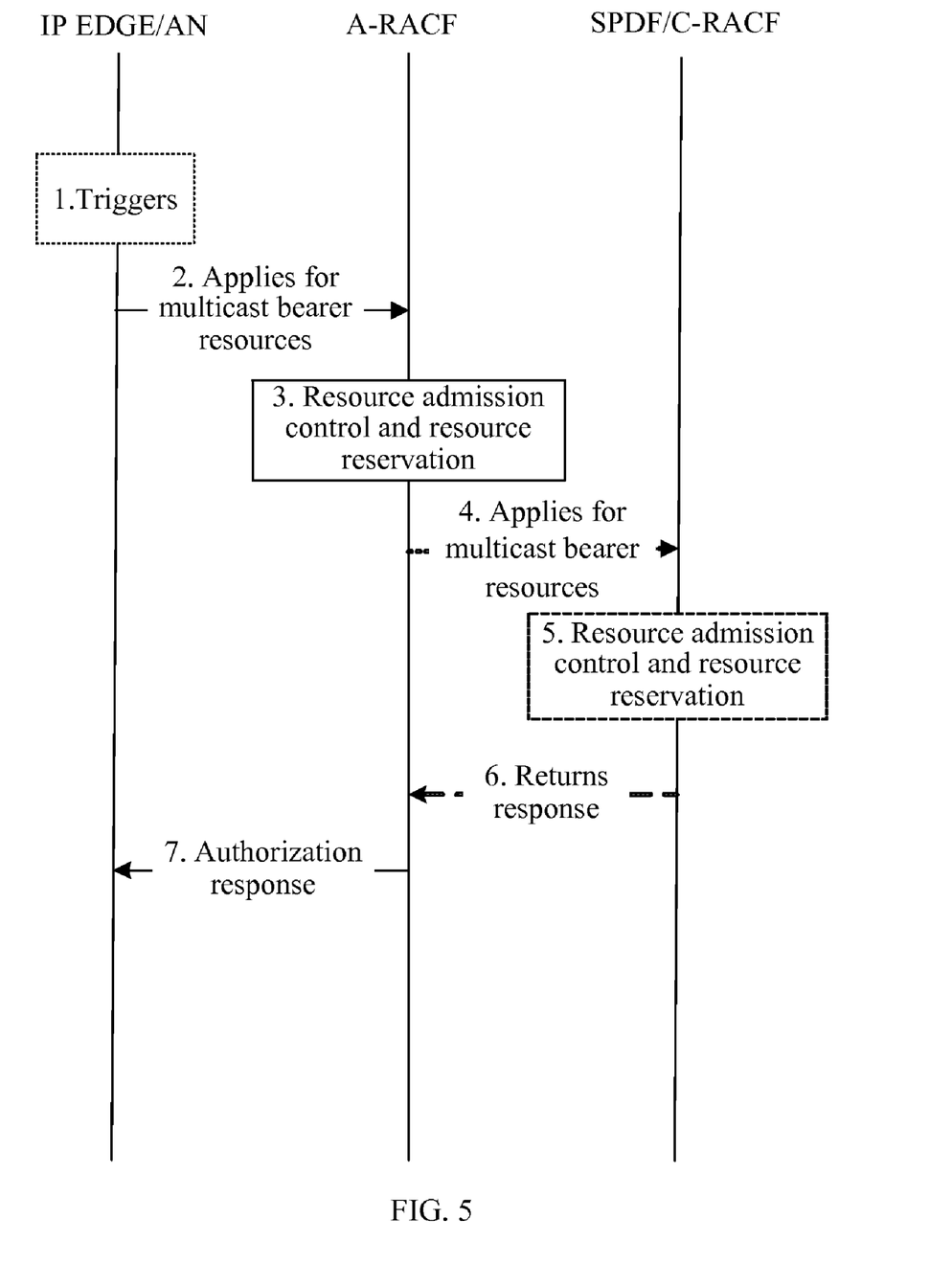
FIG. 5 is a flow chart of a method for controlling multicast bearer resources according to a first embodiment of the present invention.

In a first embodiment, when the A-RACF is used as a final policy decision point, the bearer-layer network entity IP Edge or AN applies to the A-RACF for multicast bearer resources after receiving a multicast group join request from a user. The A-RACF performs admission authorization and resource reservation for multicast bearer resources of an access side according to a policy and resource condition of the access side. Optionally, the A-RACF may further apply to the SPDF/C-RACF for multicast bearer resources of a core network. The A-RACF returns a final response to the bearer layer according to a condition of the access side or according to application results of the whole network. Referring to FIG. 5, this embodiment includes the following steps.

1. The IP Edge or AN receives a multicast group join request from a user, and obtains an address of a multicast group that the user intends to join and an IP address of the user from multicast group join request, and may also obtain other information such as one to more multicast source addresses and a source address filtering mode (for example, EXCLUDE or INCLUDE).

2. The IP Edge or AN initiates a request for applying for the multicast bearer resources to the A-RACF. The request for applying for the multicast bearer resources carries an IP address or ID of the user as well as description information of a multicast stream. The description information of the multicast stream must contain a multicast group D-class address, and optionally contains one to more multicast source addresses and a source address filtering mode (for example, EXCLUDE or INCLUDE). If the IP Edge or AN is configured with information about bandwidth resources required by a multicast group, the information also should be carried in the request for applying for the multicast bearer resources.

3. The content related to resource authorization of this step includes the following two parts.

First, optionally, the A-RACF may perform service authorization according to the request for applying for the multicast bearer resources according to a multicast service authority of the user.

Afterward, the A-RACF performs admission authorization and resource reservation for multicast bearer resources of the access side according to the policy and resource condition of the access side. Particularly, if the request for applying for the multicast bearer resources does not contain the bandwidth information, the A-RACF queries the local configuration to obtain a bandwidth required by the multicast group. If the A-RACF determines that the multicast stream already exists at the IP Edge or AN, the A-RACF needs to authorize and reserve resources of an access network. If the A-RACF determines that the multicast stream does not exist at the IP Edge or AN, the A-RACF needs to authorize and reserve resources of the access network and a converged network.

Further, optionally, the A-RACF may further apply to the SPDF/C-RACF for multicast bearer resources of a core network, that is, the process proceeds to steps 4-6.

4. The A-RACF initiates a request for applying for the multicast bearer resources of the core network to the SPDF/C-RACF. The request or applying for the multicast bearer resources of the core network carries the same information as that in the step 2.

5. The SPDF/C-RACF authorizes resources of the core network.

6. The SPDF/C-RACF returns an authorization result to indicate whether the resource authorization is passed or not.

7. The A-RACF returns a resource authorization result response to the IP Edge or AN according to an application result of the access side or according to application results of the access side and the core side.

Figure 6:
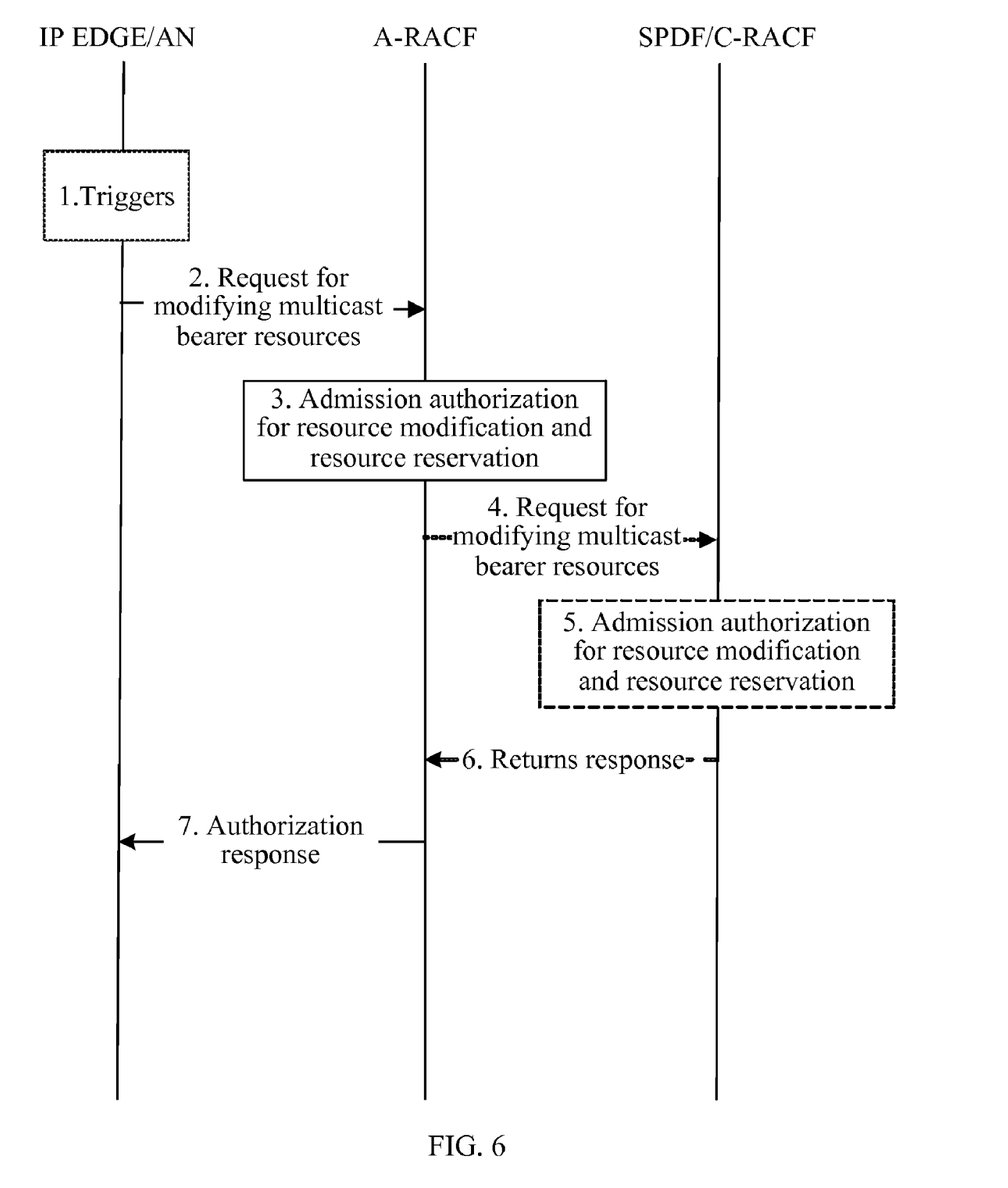
FIG. 6 is a flow chart of a method for controlling multicast bearer resources according to a second embodiment of the present invention.

In a second embodiment, when the A-RACF is used as the final policy decision point, after the bearer-layer network entity IP Edge or AN receives a request for modifying a multicast source address or other signaling messages capable of triggering resource modification from a user, the IP Edge or AN initiates a request for modifying the multicast bearer resources to the A-RACF, and the A-RACF performs admission authorization and resource modification for modifying multicast bearer resources of an access side. Optionally, the A-RACF further requests the SPDF/C-RACF for modifying multicast bearer resources of a core network. Finally, the A-RACF returns a resource modification result response to the IP Edge or AN. Referring to FIG. 6, this embodiment includes the following steps.

1. The IP Edge or AN receives a request for modifying a multicast source address or other signaling messages capable of triggering resource modification from a user, obtains an IP address of the user from the request for modifying a multicast source address, and may obtain the multicast source address that the user requests to modify or other QoS information.

2. The IP Edge or AN initiates a request for modifying the multicast bearer resources to the A-RACF. The request for modifying the multicast bearer resources needs to carry an IP address or ID of the user, and optionally carries a modified multicast source address or other QoS information.

3. The A-RACF performs admission authorization and resource reservation for modifying multicast bearer resources of the access side according to a policy and resource condition of the access side. Optionally, the A-RACF may further request the SPDF/C-RACF for modifying multicast bearer resources of a core network, that is, the process proceeds to steps 4-6.

4. The A-RACF initiates a request for modifying the multicast resources to the SPDF/C-RACF. The request for modifying the multicast resources carries the same information as that in the step 2.

5. The SPDF/C-RACF authorizes the modification of multicast resources of the core network according to a resource condition of the core network.

6. The SPDF/C-RACF returns a multicast resource modification authorization response.

7. The A-RACF returns a final authorization response to the IP Edge or AN according to a multicast resource modification result of the access side or according to multicast resource modification results of the access side and the core side.

Figure 7:
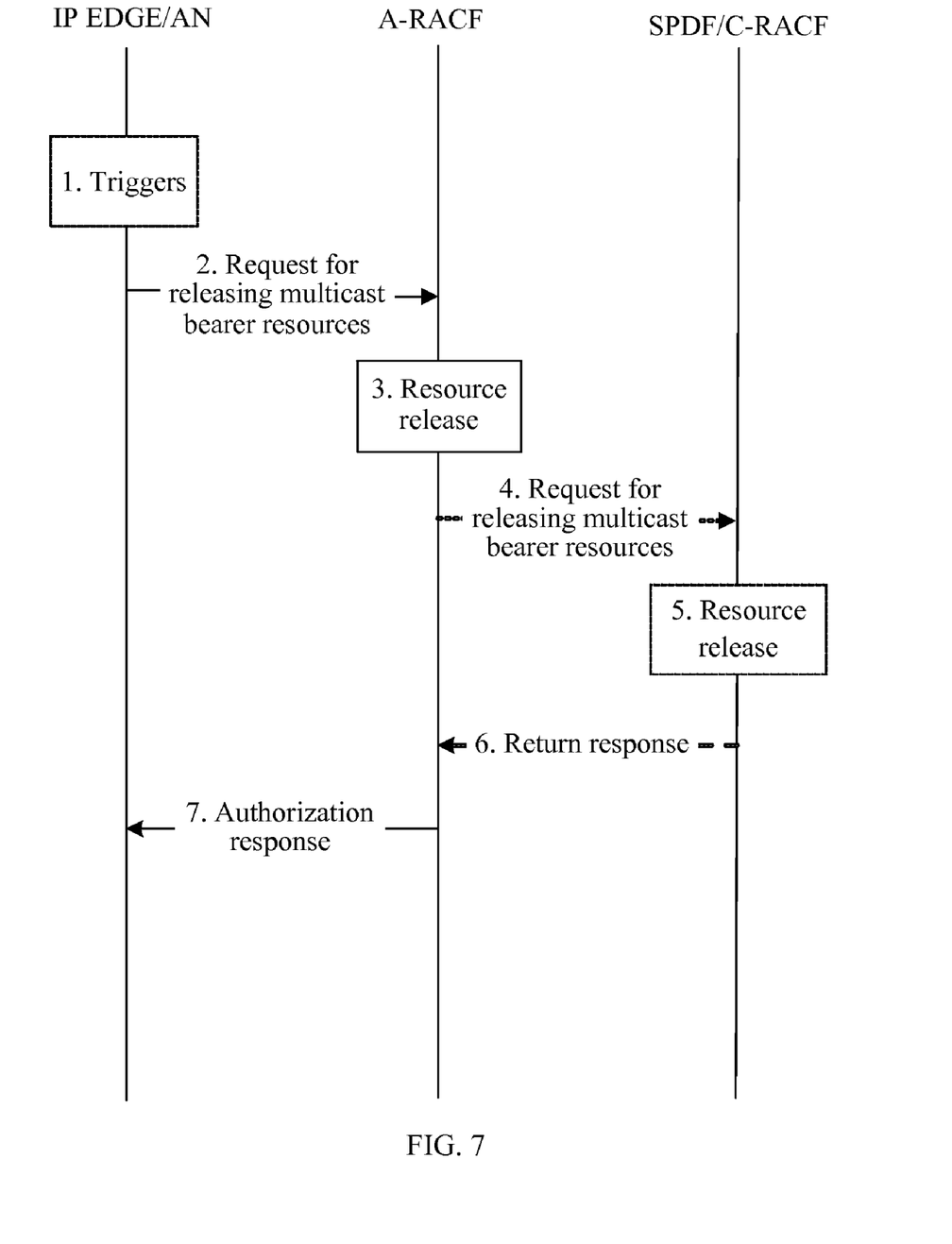
FIG. 7 is a flow chart of a method for controlling multicast bearer resources according to a third embodiment of the present invention.

In a third embodiment, when the A-RACF is used as the final policy decision point, after the bearer-layer network entity IP Edge or AN receives a multicast group leave request from the user or detects that the user has abnormally left the multicast group, the IP Edge or AN initiates a request for releasing the multicast bearer resources to the A-RACF. The A-RACF releases multicast bearer resources of an access network or multicast bearer resources of the access network and an access converged network. Optionally, the A-RACF may further request the SPDF/C-RACF for releasing resources of a core network. Finally, the A-RACF returns a resource release response to the IP Edge or AN. Referring to FIG. 7, this embodiment includes the following steps.

1. After receiving a request for leaving a multicast group from the user or detecting that the user has abnormally left the multicast group, the IP Edge or AN obtains an address of the multicast group that the user intends to leave and an IP address of the user from the request for leaving a multicast group.

2. The IP Edge or AN initiates a request for releasing the multicast bearer resources to the A-RACF. If an interface between the IP Edge or AN and the A-RACF adopts a diameter protocol, the request for releasing the multicast bearer resources needs to carry a session ID. If an interface between the IP Edge or AN and the A-RACF does not adopt a diameter protocol, the request for releasing the multicast bearer resources needs to carry an IP address or ID of the user as well as description information of a multicast group.

3. The A-RACF releases multicast bearer resources of the access network. If the A-RACF determines that at least one of other users at the IP Edge or AN belongs to the multicast group, the A-RACF only needs release resources of the access network. If the user is the last one at the IP Edge or AN that leaves the multicast group, the A-RACF needs to release resources of both the access network and the converged network. Optionally, the A-RACF may further request the SPDF/C-RACF for releasing multicast bearer resources of the core network, that is, the process proceeds to steps 4-6.

4. The A-RACF initiates a request for releasing the multicast bearer resources to the SPDF/C-RACF. The request for releasing the multicast bearer resources carries a session ID.

5. The SPDF/C-RACF releases multicast resources of the core network.

6. The SPDF/C-RACF returns a multicast resource release response.

7. The A-RACF returns a final response to the IP Edge or AN according to a multicast resource release result of the access side or according to multicast resource release results of the access side and the core side.

Figure 8:
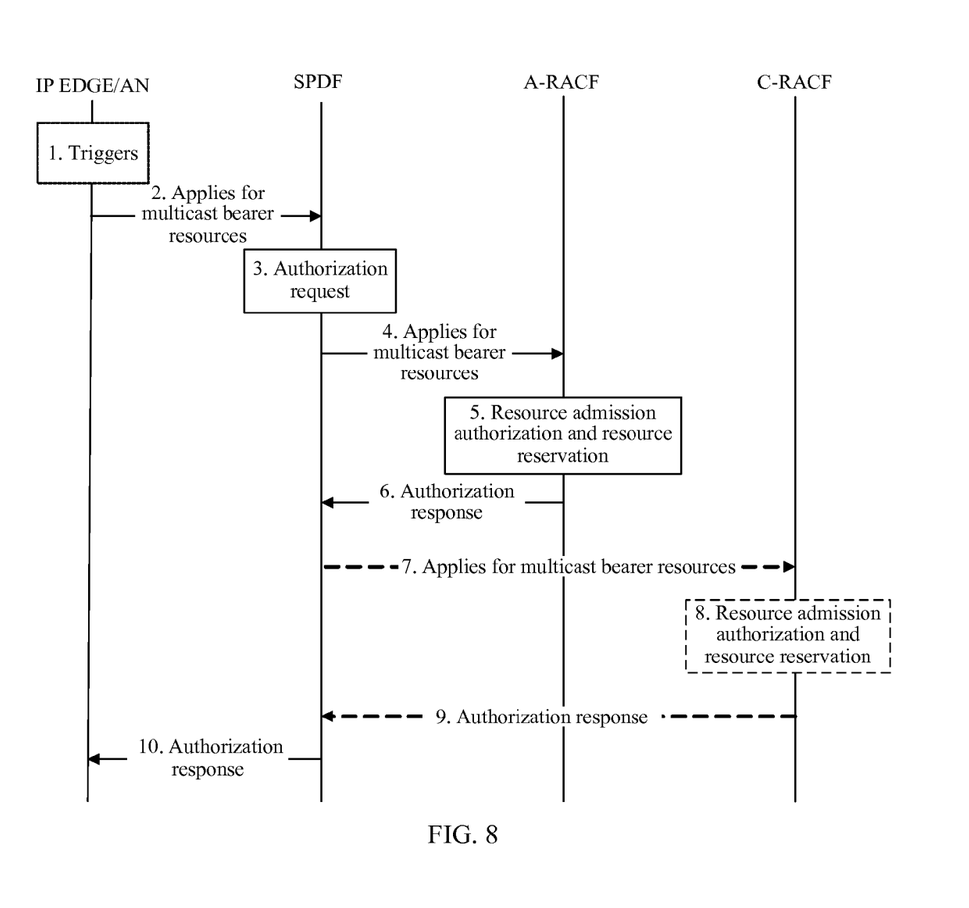
FIG. 8 is a flow chart of a method for controlling multicast bearer resources according to a fourth embodiment of the present invention.

In a fourth embodiment, when the SPDF is used as the final policy decision point, a multicast resource application request/response needs to be transferred between the bearer-layer network entity IP Edge or AN and the SPDF. A Gq' interface (adapted to transfer a unicast resource authorization request/response in the conventional art) may be reused between the IP Edge or AN and the SPDF, and the interface capability may be expanded to support the transfer of the multicast resource application request/response.

After receiving a multicast group join request from the user, the IP Edge or AN initiates a request for applying for the multicast bearer resources to the SPDF. The SPDF authorizes the request for applying for the multicast bearer resources, and applies to the A-RACF for multicast bearer resources of an access side. The A-RACF performs admission authorization and resource reservation for the multicast bearer resources of the access side according to a policy and condition of resources reminding of the access side, and returns an application result to the SPDF at the same time. Optionally, the SPDF may further apply to the C-RACF for multicast bearer resources of a core network. The SPDF returns a final response to the IP Edge or AN according to a resource authorization condition of the access side or the whole network. Referring to FIG. 8, this embodiment includes the following steps.

1. The IP Edge or AN receives a multicast group join request from the user, and obtains an address of a multicast group that the user intends to join and an IP address of the user from the message, and may also obtain other information such as one to more multicast source addresses and a source address filtering mode (for example, EXCLUDE or INCLUDE).

2. The IP Edge or AN initiates a request for applying for the multicast bearer resources to the SPDF. The request for applying for the multicast bearer resources carries an IP address or ID of the user as well as description information of a multicast stream. The description information of the multicast stream must contain a multicast group D-class address, and optionally contains one to more multicast source addresses and a source address filtering mode (for example, EXCLUDE or INCLUDE). If the IP Edge or AN is configured with information about bandwidth resources required by a multicast group at this time, the information should be carried in the request for applying for the multicast bearer resources.

3. The SPDF perform service authorization according to the request for applying for the multicast bearer resources. Meanwhile, optionally, the SPDF may request the C-RACF for authorizing multicast bearer resources of the core network, that is, the process proceeds to steps 7-9.

4. The SPDF initiates a request for applying for the multicast bearer resources to the A-RACF. The request for applying for the multicast bearer resources carries the same information as that in the step 2.

5. After receiving the request for applying for the multicast bearer resources, the A-RACF performs admission authorization and resource reservation for multicast bearer resources of the access side according to the policy and resource condition of the access side. Particularly, the A-RACF determines whether a corresponding multicast stream already exists at the corresponding IP Edge or AN or not. If the A-RACF determines that a corresponding multicast stream already exists at the corresponding IP Edge or AN, the A-RACF performs admission authorization and resource reservation for multicast bearer resources of the access side according to a network resource condition of the access network. If the A-RACF determines that a corresponding multicast stream already does not exist at the corresponding IP Edge or AN, the A-RACF performs admission authorization and resource reservation for multicast bearer resources of the access network and the access converged network according to network resource conditions of the access network and the access converged network.

6. The A-RACF returns an authorization result to indicate whether the multicast resource authorization is passed.

7. Optionally, the SPDF applies to the C-RACF for multicast bearer resources of the core network.

8. The C-RACF authorizes the request for applying for the multicast bearer resources according to the resource condition of the core network.

9. The C-RACF returns an authorization response to the SPDF.

10. The SPDF returns a response to the bearer layer according to a multicast resource authorization result of the access side or according to multicast resource authorization results of the access side and the core side.

Figure 9:
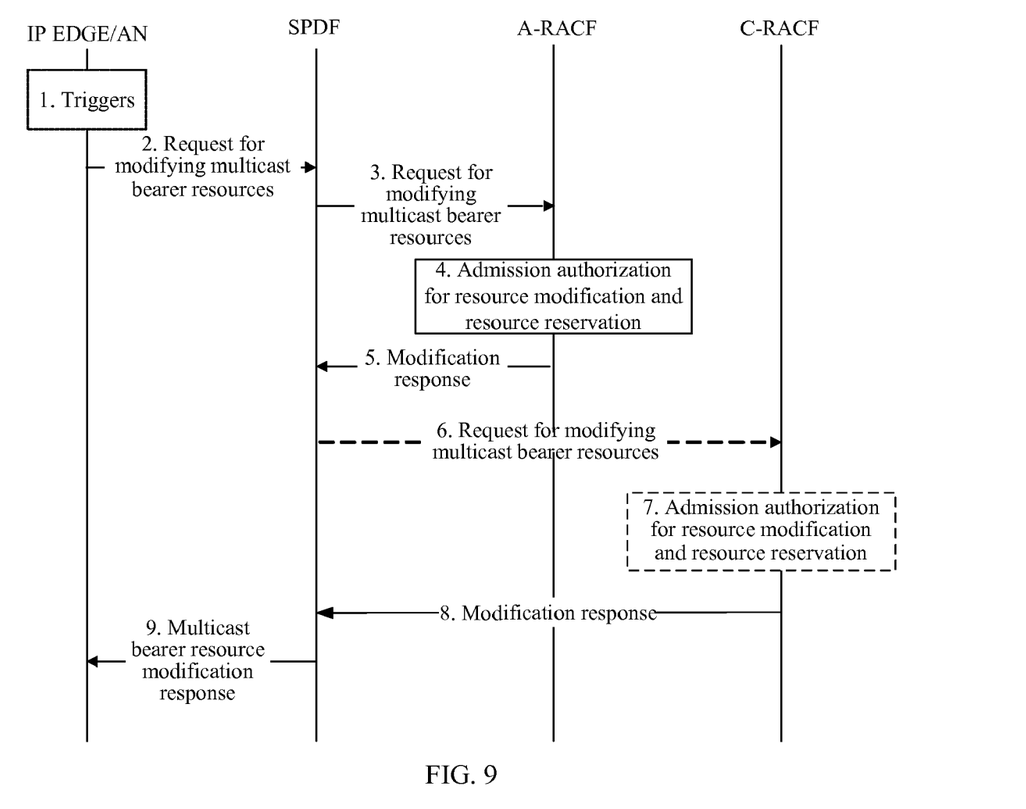
FIG. 9 is a flow chart of a method for controlling multicast bearer resources according to a fifth embodiment of the present invention.

In a fifth embodiment, when the SPDF is used as the final policy decision point, a multicast resource modification request/response needs to be transferred between the bearer-layer network entity IP Edge or AN and the SPDF. A Gq' interface (adapted to transfer a unicast resource authorization modification request/response in the conventional art) may be reused between the IP Edge or AN and the SPDF, and the interface capability may be expanded to support the transfer of the multicast resource modification request/response.

After the IP Edge or AN receives a request for modifying a multicast source address or other signaling messages capable of triggering resource modification from a user, the IP Edge or AN initiates a request for modifying the multicast bearer resources to the SPDF. The SPDF authorizes the request for modifying the multicast bearer resources and requests the A-RACF for modifying multicast bearer resources of an access side. Optionally, the SPDF may further request the C-RACF for modifying multicast bearer resources of a core network. Finally, the SPDF returns a resource modification result response to the IP Edge or AN. Referring to FIG. 9, this embodiment includes the following steps.

1. The IP Edge or AN receives a request for modifying a multicast source address or other signaling messages capable of triggering resource modification from the user, obtains an IP address of the user from the request for modifying a multicast source address, and may obtain a modified multicast source address or other QoS information.

2. The IP Edge or AN initiates a request for modifying the multicast bearer resources to the SPDF. The request for modifying the multicast bearer resources carries an IP address of the user, and optionally carries the modified multicast source address or other QoS information.

3. The SPDF initiates a request for modifying the multicast resources to the A-RACF. The request for modifying the multicast resources carries the same information as that in step 2.

4. After receiving the request for modifying the resources sent by the SPDF, the A-RACF performs admission authorization and resource reservation for modifying multicast bearer resources of the access side according to a policy and resource condition of the access side according to the request for modifying the multicast resources.

5. The A-RACF returns a multicast resource modification authorization result.

6. Optionally, the SPDF requests the C-RACF for modifying multicast bearer resources of the core network.

7. The C-RACF authorizes the modification of the multicast bearer resources of the core network according to a resource condition of the core network.

8. The C-RACF returns a multicast bearer resource modification response.

9. The SPDF returns a final response to the IP Edge or AN according to the multicast resource modification authorization result of the access side or according to multicast resource modification authorization results of the access side and the core side.

Figure 10:
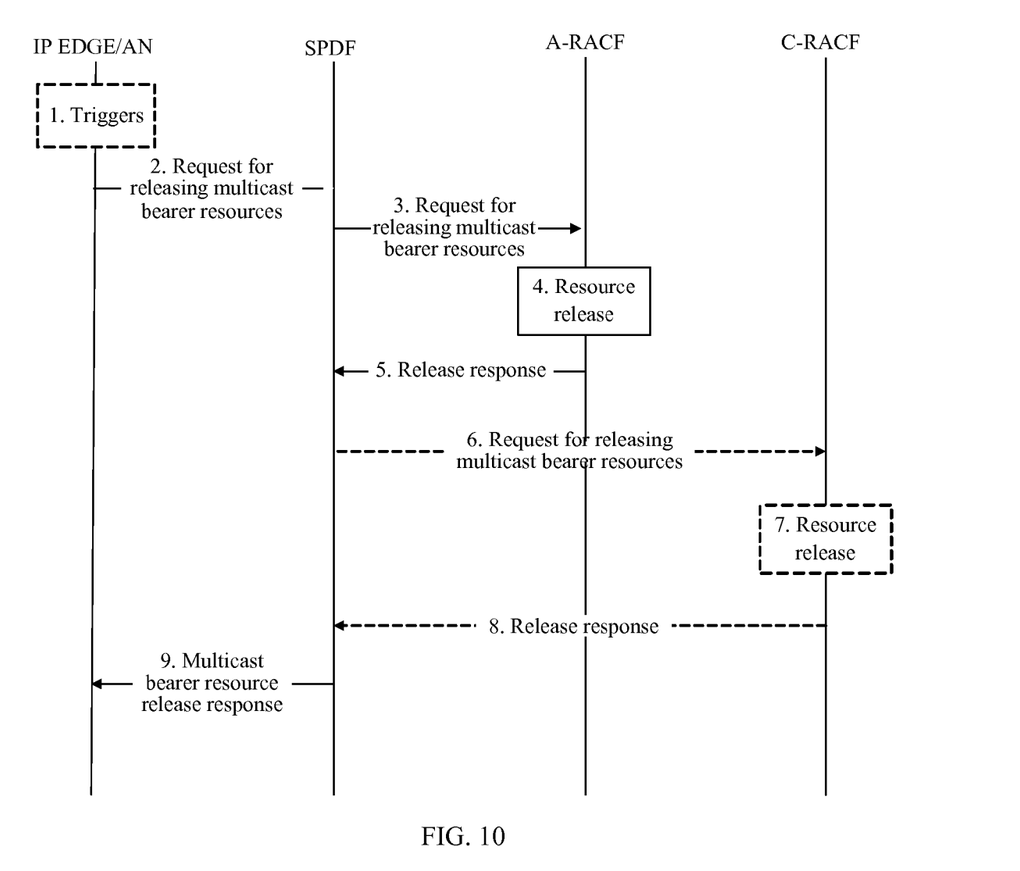
FIG. 10 is a flow chart of a method for controlling multicast bearer resources according to a sixth embodiment of the present invention.

In a sixth embodiment, when the SPDF is used as the final policy decision point, a multicast resource release request/response needs to be transferred between the bearer-layer network entity IP Edge or AN and the SPDF. A Gq' interface (adapted to transfer a unicast resource authorization request/response in the conventional art) may be reused between the IP Edge or AN and the SPDF, and the interface capability may be expanded to support the transfer of the multicast resource release request/response.

After the IP Edge or AN receives a multicast group leave request from the user, the IP Edge or AN initiates a request for releasing the multicast resources to the SPDF. The SPDF requests the A-RACF for releasing multicast bearer resources of an access side. The A-RACF returns a response. At this time, optionally, the SPDF may further request the C-RACF for releasing multicast bearer resources of a core network. Finally, the SPDF returns a resource release response to the IP Edge or AN. Referring to FIG. 10, this embodiment includes the following steps.

1. After receiving a request for leaving a multicast group from the user, the IP Edge or AN obtains an address of the multicast group that the user intends to leave and an IP address of the user from the message.

2. The IP Edge or AN initiates a request for releasing the multicast bearer resources to the SPDF. If an interface between the IP Edge or AN and the SPDF adopts a diameter protocol, the request for releasing the multicast bearer resources only needs to carry a session ID. If an interface between the IP Edge or AN and the SPDF does not adopt a diameter protocol, the request for releasing the multicast bearer resources needs to carry an IP address or ID of the user as well as description information of a multicast group.

3. The SPDF initiates a multicast resource release request to the A-RACF to request the A-RACF to release multicast resources of the access side. The request carries the session ID.

4. After receiving the resource release request sent by the SPDF, the A-RACF releases corresponding multicast resources. Particularly, the A-RACF determines whether there is no user uses the multicast stream at the corresponding IP Edge or AN or not. If the A-RACF determines that there is no user using the multicast stream at the corresponding IP Edge or AN, the A-RACF releases network resources occupied by corresponding multicast streams of the access network and the access converged network. If the A-RACF determines that there is user using the multicast stream at the corresponding IP Edge or AN, the A-RACF only releases network resources occupied by corresponding multicast streams of the access network.

5. The A-RACF returns a multicast resource release result.

6. Optionally, the SPDF requests the C-RACF for releasing multicast bearer resources of the core network.

7. The C-RACF releases the multicast bearer resources of the core network.

8. The C-RACF returns a resource release response.

9. The SPDF returns a final response to the IP Edge or AN according to a multicast resource release result of the access side or according to multicast resource release results of the access side and the core side.

Figure 11:
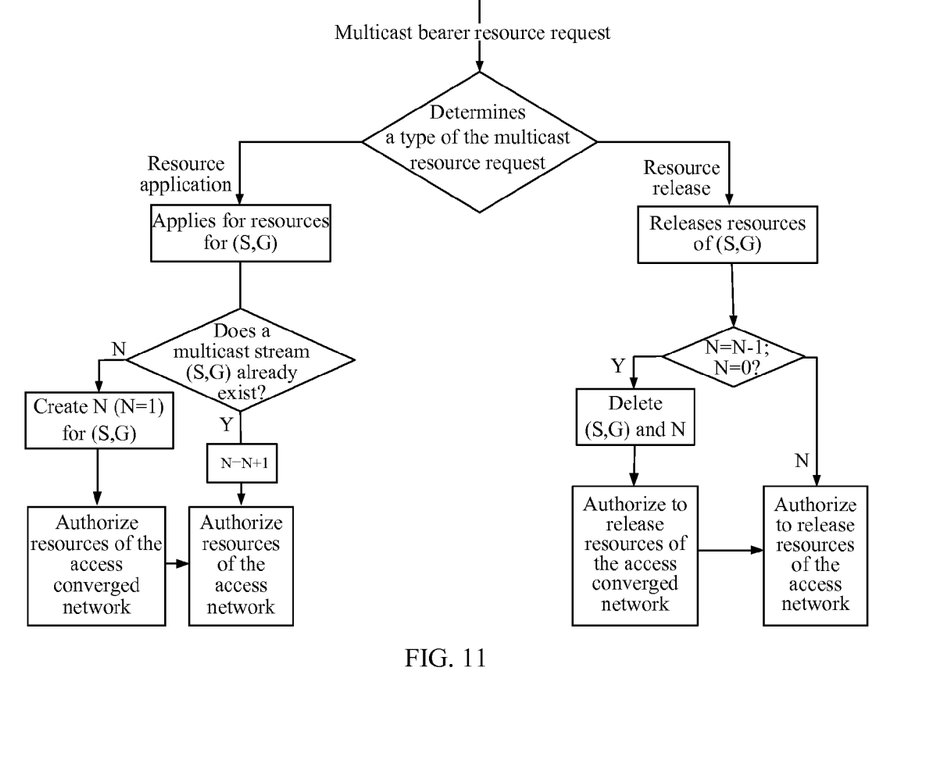
FIG. 11 is a flow chart of a method for controlling multicast bearer resources according to a seventh embodiment of the present invention.

In a seventh embodiment, as can be seen from the above embodiments, due to the differences between multicast and unicast technologies, the SPDF and/or the A-RACF need to be additionally provided with the capability of processing multicast resource related requests (application, release, or modification) according to the characteristics of the multicast technology, so as to enable the RACS to implement the control over the multicast bearer resources. Here, algorithms for processing the multicast resource related requests by the A-RACF are exemplified as follows.

(S,G) represents a multicast stream, where S is a multicast source address, and G is a multicast group address; and N is the number of access users served by the (S,G) at the IP Edge or AN.

The A-RACF needs to store a corresponding relation between a multicast stream (S,G) requesting for resources and the number (N) of users receiving the multicast stream, and update N in real-time, so as to determine a process for processing a multicast resource request. The algorithms for processing the multicast resource related requests by the A-RACF are as shown in FIG. 11. When the A-RACF receives a multicast resource request from the SPDF, the A-RACF determines a type of the request.

a) Request for applying for the multicast resources. The A-RACF determines whether a multicast stream (S,G) already exists or not. If the A-RACF determines that a multicast stream (S,G) does not exist, the A-RACF creates a corresponding N (N=1) for this (S,G), and authorizes multicast resources of the access network and the access converged network at the same time. If a corresponding N already exists, N=N+1, and multicast resources of the access network is authorized.

b) Request for releasing the multicast resources. The A-RACF determines whether N is equal to 0 or not after (N=N−1) corresponding to (S,G). If the A-RACF determines that N is equal to 0 after (N=N−1) corresponding to (S,G), the corresponding relation between (S,G) and N is deleted, and multicast resources of the access network and the access converged network are authorized to be released. Otherwise, multicast resources of the access network are authorized to be released.

c) Request for modifying the multicast resources. First, new multicast resources are applied according to the algorithm described in a); original multicast resources are released according to the algorithm described in b).

To sum up, multicast resource management and multicast resource admission control functions are generally directly realized at a bearer layer-entity in the architecture of the current live television/broadcast television (LTV/BTV) system. On one hand, as this method requires the management and admission control of multicast resources to be realized at the bearer layer-entity, the complexity of the bearer layer equipment is increased. As many existing bearer layer equipments such as Ethernet switches and routers do not support the multicast resource management and admission control functions, it is difficult to implement this method into actual networking applications. On the other hand, multicast bearer resources are managed at the bearer-layer entity in this method, while unicast bearer resources are managed in the RACS in the current next generation network (NGN) architecture. As a result, the management of unicast and multicast bearer resources is separated in the NGN network, causing that unicast and multicast services cannot fully share the network bearer resources, or it needs to introduce a complex network bearer resource synchronization mechanism to achieve the sharing of network resources between unicast and multicast services. The method for controlling multicast bearer resources by using an RACS in an NGN network provided by the present invention is a preferred solution.

Currently, the RACS architecture only supports the management of unicast bearer resources, but cannot support the control over multicast bearer resources.

Therefore, in the present invention, after receiving a request for controlling multicast bearer resources from the user, the bearer-layer entity forwards the request to the RACS. After receiving the request for controlling the multicast bearer resources from the bearer-layer network entity, the network entity in the RACS controls the multicast bearer resources according to the request for controlling multicast bearer resources and returns a control response to the bearer-layer network entity. As such, the RACS can support the resource control of multicast traffic flows. In this way, the management and admission control function for multicast resources does not need to be introduced into the bearer-layer entity. Meanwhile, centralized and unified management of unicast and multicast resources can be achieved, thus ensuring unicast and multicast services to fully share the bearer resources. Thus, the QoS of the IPTV multicast services is improved, thus ensuring the smooth proceeding of the IPTV services.

Those of ordinary skill in the art should understand that all or a part of the steps of the method according to the embodiments of the present invention may be implemented by a program instructing relevant hardware. The program may be stored in a computer readable storage medium. When the program is executed, the steps of the method according to the embodiments of the present invention are performed. The storage medium may be any medium that is capable of storing program codes, such as a ROM, a RAM, a magnetic disk, and an optical disk.

Finally, it should be understood that the above embodiments are only used to explain, but not to limit the technical solution of the present invention. In despite of the detailed description of the present invention with reference to above preferred embodiments, it should be understood that various modifications, changes or equivalent replacements can be made by those skilled in the art without departing from the spirit and scope of the present invention and covered in the claims of the present invention.

What is claimed is:

1. A method for controlling multicast bearer resources, comprising:
   receiving, by a Service-based Policy Decision Function (SPDF), a request for controlling multicast bearer resources from a bearer-layer network entity; and
   controlling, by the SPDF, the multicast bearer resources;
   wherein, the process of controlling, by the SPDF, the multicast bearer resources comprises: applying, by the SPDF, to an Access-Resource and Admission Control Function (A-RACF), for the multicast bearer resources of an access side; and applying, by the SPDF, to a Core-Resource and Admission Control Function (C-RACF), for the multicast bearer resources of a core network;
   wherein the A-RACF receives a request for applying for the multicast bearer resources; if the request for applying for the multicast bearer resources does not contain bandwidth information, the A-RACF queries local configuration to obtain a bandwidth required by the multicast group.

2. The method according to claim 1, wherein the process of controlling, by the SPDF, the multicast bearer resources comprises:
   receiving, by SPDF, a request for modifying the multicast bearer resources from the bearer-layer network entity;
   performing, by the SPDF, admission authorization and resource modification for modifying the multicast bearer resources; and
   returning, by the SPDF, a resource modification result response to the bearer-layer network entity.

3. The method according to claim 1, wherein the process of controlling, by the SPDF, the multicast bearer resources comprises:
   receiving, by the SPDF, a request for releasing the multicast bearer resources from the bearer-layer network entity;
   releasing, by the SPDF, the multicast bearer resources; and
   returning, by the SPDF, a release result response to the bearer-layer network entity.

4. A network entity located in a Resource and Admission Control Subsystem, RACS, comprising:
   a receiving unit, adapted to receive a request for controlling multicast bearer resources from a bearer-layer network entity;
   a control unit, adapted to control the multicast bearer resources;
   wherein, the network entity is a Service-based Policy Decision Function (SPDF); and
   wherein the process of controlling the multicast bearer resources comprises: applying, to an Access-Resource and Admission Control Function (A-RACF), for the multicast bearer resources of an access side; and applying, to a Core-Resource and Admission Control Function (C-RACF), for the multicast bearer resources of a core network;
   wherein the A-RACF receives a request for applying for the multicast bearer resources; if the request for applying for the multicast bearer resources does not contain bandwidth information, the A-RACF queries local configuration to obtain a bandwidth required by the multicast group.

5. The entity according to claim 4, further comprising: a response unit, adapted to return a control response to the bearer-layer network entity that initiates the request for controlling multicast bearer resources.

6. A system for controlling multicast bearer resources, comprising:
   a bearer-layer network entity, adapted to initiate a request for controlling multicast bearer resources; and
   a Service-based Policy Decision Function (SPDF), adapted to receive the request for controlling the multicast bearer resources from the bearer-layer network entity, and control the multicast bearer resources;
   wherein the process of controlling the multicast bearer resources comprises: applying, to an Access-Resource and Admission Control Function (A-RACF), for multicast bearer resources of an access side; and applying, to a Core-Resource and Admission Control Function (C-RACF), for the multicast bearer resources of a core network;
   wherein the A-RACF receives a request for applying for the multicast bearer resources; if the request for applying for the multicast bearer resources does not contain bandwidth information, the A-RACF queries local configuration to obtain a bandwidth required by the multicast group.

7. The method according to claim 1, wherein the process of controlling, by the SPDF, the multicast bearer resources comprises:
   returning, by the SPDF, a resource application result response to the bearer-layer network entity according to application results of the access side and the core network.

8. The method according to claim 1, wherein the process of controlling, by the SPDF, the multicast bearer resources comprises:
   performing, by the SPDF, service authorization according to the request for applying for the multicast bearer resources according to a multicast service authority before applying for the multicast bearer resources.

9. The method according to claim 3, wherein the process of controlling, by the SPDF, the multicast bearer resources comprises:
   performing, by the SPDF, service authorization according to the request for applying for the multicast bearer resources according to a multicast service authority before applying for the multicast bearer resources.

10. The method according to claim 2, wherein the process of controlling, by the SPDF, the multicast bearer resources comprises:
returning, by the SPDF, a resource modification result response to the bearer-layer network entity according to modification results of the access side and the core network.

11. The method according to claim 1, wherein the process of controlling, by the SPDF, the multicast bearer resources comprises:
requesting, by the SPDF, modifying the multicast bearer resources of an access side to an A-RACF;
requesting, by the SPDF, modifying the multicast bearer resources of a core network to a C-RACF; and
returning, by the SPDF, a resource modification result response to the bearer-layer network entity according to modification results of the access side and the core network.

12. The method according to claim 2, wherein the process of controlling, by the SPDF, the multicast bearer resources comprises:
requesting, by the SPDF, modifying the multicast bearer resources of an access side to an A-RACF;
requesting, by the SPDF, modifying the multicast bearer resources of a core network to a C-RACF; and
returning, by the SPDF, a resource modification result response to the bearer-layer network entity according to modification results of the access side and the core network.

13. The method according to claim 10, wherein the process of controlling, by the SPDF, the multicast bearer resources comprises:
requesting, by the SPDF, modifying the multicast bearer resources of an access side to an A-RACF;
requesting, by the SPDF, modifying the multicast bearer resources of a core network to a C-RACF; and
returning, by the SPDF, a resource modification result response to the bearer-layer network entity according to modification results of the access side and the core network.

14. The method according to claim 3, wherein the process of controlling, by the SPDF, the multicast bearer resources comprises:
requesting, by the SPDF, releasing the multicast bearer resources of an access side to an A-RACF;
requesting, by the SPDF, releasing the multicast bearer resources of a core network to an C-RACF; and
returning, by the SPDF, a release result response to the bearer-layer network entity according to release results of the access side and the core network.

15. The entity according to claim 4, wherein the process of controlling the multicast bearer resources comprises:
requesting, modifying the multicast bearer resources of an access side to an A-RACF;
requesting, modifying the multicast bearer resources of a core network to a C-RACF; and
returning, a resource modification result response to the bearer-layer network entity according to modification results of the access side and the core network.

16. The entity according to claim 5, wherein the process of controlling the multicast bearer resources comprises:
requesting, modifying the multicast bearer resources of an access side to an A-RACF;
requesting, modifying the multicast bearer resources of a core network to a C-RACF; and
returning, a resource modification result response to the bearer-layer network entity according to modification results of the access side and the core network.

17. The entity according to claim 5, wherein the process of controlling the multicast bearer resources comprises:
requesting, releasing the multicast bearer resources of an access side to an A-RACF;
requesting, releasing the multicast bearer resources of a core network to an C-RACF; and
returning, a release result response to the bearer-layer network entity according to release results of the access side and the core network.

18. The system according to claim 6, wherein the process of controlling the multicast bearer resources comprises:
requesting, by the SPDF, modifying the multicast bearer resources of an access side to an A-RACF;
requesting, by the SPDF, modifying the multicast bearer resources of a core network to a C-RACF; and
returning, by the SPDF, a resource modification result response to the bearer-layer network entity according to modification results of the access side and the core network.

19. The system according to claim 18, wherein the process of controlling, by the network entity in the RACS, the multicast bearer resources comprises:
requesting, by the SPDF, releasing the multicast bearer resources of an access side to an A-RACF;
requesting, by the SPDF, releasing the multicast bearer resources of a core network to an C-RACF; and
returning, by the SPDF, a release result response to the bearer-layer network entity according to release results of the access side and the core network.

20. The system according to claim 19, wherein the process of controlling, by the network entity in the RACS, the multicast bearer resources comprises:
requesting, by the SPDF, releasing the multicast bearer resources of an access side to an A-RACF;
requesting, by the SPDF, releasing the multicast bearer resources of a core network to an C-RACF; and
returning, by the SPDF, a release result response to the bearer-layer network entity according to release results of the access side and the core network.

* * * * *